(12) United States Patent
Unni et al.

(10) Patent No.: US 10,267,519 B2
(45) Date of Patent: Apr. 23, 2019

(54) SYSTEM AND METHOD FOR DETECTING PRECURSORS TO CONTROL BLOWOUT IN COMBUSTION SYSTEMS

(71) Applicant: Indian Institute of Technology Madras, Chennai (IN)

(72) Inventors: Vishnu Rajasekharan Unni, Chennai (IN); Vineeth Nair Vinod, Chennai (IN); Sujith Raman Pillai Indusekharan Nair, Chennai (IN)

(73) Assignee: INDIAN INSTITUTE OF TECHNOLOGY MADRAS, Chennai, TN (IN)

( * ) Notice: Subject to any disclaimer, the term of this patent is extended or adjusted under 35 U.S.C. 154(b) by 341 days.

(21) Appl. No.: 15/033,898

(22) PCT Filed: Nov. 7, 2014

(86) PCT No.: PCT/IN2014/000714
§ 371 (c)(1),
(2) Date: May 2, 2016

(87) PCT Pub. No.: WO2015/068176
PCT Pub. Date: May 14, 2015

(65) Prior Publication Data
US 2016/0273767 A1   Sep. 22, 2016

(30) Foreign Application Priority Data
Nov. 8, 2013   (IN) ............................ 5041/CHE/2013

(51) Int. Cl.
*F02C 9/28* (2006.01)
*F23N 5/00* (2006.01)
*F23N 5/24* (2006.01)

(52) U.S. Cl.
CPC ................ *F23N 5/242* (2013.01); *F02C 9/28* (2013.01); *F23N 5/003* (2013.01);
(Continued)

(58) Field of Classification Search
CPC ......... F05D 2270/083; F05D 2270/092; F05D 2270/333; F05D 2270/334
See application file for complete search history.

(56) References Cited

U.S. PATENT DOCUMENTS 6,144,877 A * 11/2000 DePetrillo ............... G06F 17/10
                                                            600/515
9,804,054 B2 * 10/2017 Vinod ................. F02D 41/1498
(Continued)

OTHER PUBLICATIONS

L. Kabiraj "Nonlinear self-excited thermoacoustic oscillations: intermittency and flame blowout", J. Fluid Mech. 2012, vol. 713, pp. 376-397, first published online Oct. 17, 2012.*
(Continued)

*Primary Examiner* — Gerald L Sung
*Assistant Examiner* — Scott J Walthour

(57) ABSTRACT

A method and system for determining one or more precursors to control blowout in a combustor is provided. The method includes obtaining a time series signal corresponding to a dynamic state variable of the combustor. The method includes detecting one or more precursor based on an analysis of the time series signal using one or more parameters to control blowout in the combustor. One or more parameters include a Hurst exponent estimation, a Burst count estimation, and a recurrence quantification based estimation.

8 Claims, 8 Drawing Sheets

(52) U.S. Cl.
CPC .... *F05D 2260/821* (2013.01); *F05D 2260/96* (2013.01); *F05D 2270/092* (2013.01); *F05D 2270/14* (2013.01); *F05D 2270/334* (2013.01); *F23N 2031/06* (2013.01); *F23N 2041/20* (2013.01); *F23R 2900/00013* (2013.01); *Y02T 50/677* (2013.01)

(56) References Cited

U.S. PATENT DOCUMENTS

| | | | | |
|---|---|---|---|---|
| 2005/0056024 | A1* | 3/2005 | Lieuwen | F23D 14/725 60/779 |
| 2006/0137353 | A1* | 6/2006 | Lieuwen | F01D 21/003 60/772 |
| 2011/0319784 | A1* | 12/2011 | Nakagawa | A61B 5/0476 600/544 |
| 2015/0260609 | A1* | 9/2015 | Vinod | F02D 41/1498 702/56 |
| 2016/0282885 | A1* | 9/2016 | Unni | G05B 23/0227 |

OTHER PUBLICATIONS

Iwanski et al. "Recurrence plots of experimental data: To embed or not to embed?" 1998. Chaos. 8:861-871.*

Giurgiutiu et al. "Piezoelectric Wafter Active Sensor Embedded Ultrasonics in Beams and Plates" 2003. Experimental Mechanics. vol. 43, No. 4. Dec. 2003.*

* cited by examiner

SYSTEM AND METHOD FOR DETECTING PRECURSORS TO CONTROL BLOWOUT IN COMBUSTION SYSTEMS

The embodiments herein generally relate to combustion systems and more particularly but not exclusively to blowout in combustion systems. The present application is based on, and claims priority from Indian Application Number 5041/CHE/2013 filed on 8 Nov. 2013, and PCT/IN2014/000714 filed on 7 Nov. 2014 the disclosure of which is hereby incorporated by reference.

TECHNICAL FIELD

Background

Emission of exhaust gases are a concern for any type of combustion systems such as aircraft engines, gas turbines etc. Significant level of hazardous pollutants such as Nitrogen Oxides ($NO_X$) may be present in the emissions from a combustor. To maintain $NO_X$ levels significantly low, a combustor operator attempts to operate the combustor in a lean combustion mode that involves employing more air molecules per fuel molecule for combustion. During the lean combustion the combustor is operated closer to a lean blowout (complete loss of flame in the combustor) region that reduces $NO_X$ emissions but poses a risk of complete loss of flame in the combustor. The occurrence of the lean blowout results in shutdown of the combustion system. This undesired and unexpected shutdown of the combustion system is unfavorable and may pose a dangerous situation. For example, if the aircraft engine shuts down while in the air, the aircraft loses thrust and may result in fatal accident. Similarly, if a gas turbine based power generation plant unexpectedly shuts down, it may result in shortcomings in power generation. Thus, above situations demand methods to predict the blowout conditions so as to effectively control parameters of the combustor before the blowout.

Existing methods for determining blowout precursors utilize spectral analysis, statistical analysis, and wavelet analysis. However a method and system providing a robust prediction of blowout precursor will be appreciated.

SUMMARY

The principle object of embodiments herein is to provide a system and a method for detecting one or more blowout precursors to control blowout in a combustion system.

Another object of the embodiments herein is to provide a system and a method for detecting one or more blowout precursors using one or more parameters. One or more parameters include but are not limited to a Hurst exponent estimation, a Burst count estimation, and a recurrence quantification based estimation.

Accordingly the invention provides a method for detecting at least one precursor to control blowout in a combustor. The method, comprising obtaining a time series signal corresponding to a dynamic state variable of the combustor. Further, the method comprises detecting at least one precursor based on an analysis of the time series signal using at least one parameter to control blowout in the combustor, wherein at least one parameter comprises at least one of a Hurst exponent estimation, a Burst count estimation, and a recurrence quantification based estimation.

Accordingly, the invention provides a system for detecting at least one precursor to control blowout in a combustor. The system comprises a precursor detection unit configured to obtain a time series signal corresponding to a dynamic state variable of the combustor. Further, the precursor detection unit configured to detect at least one precursor based on an analysis of the time series signal using at least one parameter to control blowout in the combustor, wherein at least one parameter comprises one of a Hurst exponent estimation, a Burst count estimation, and a recurrence quantification based estimation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
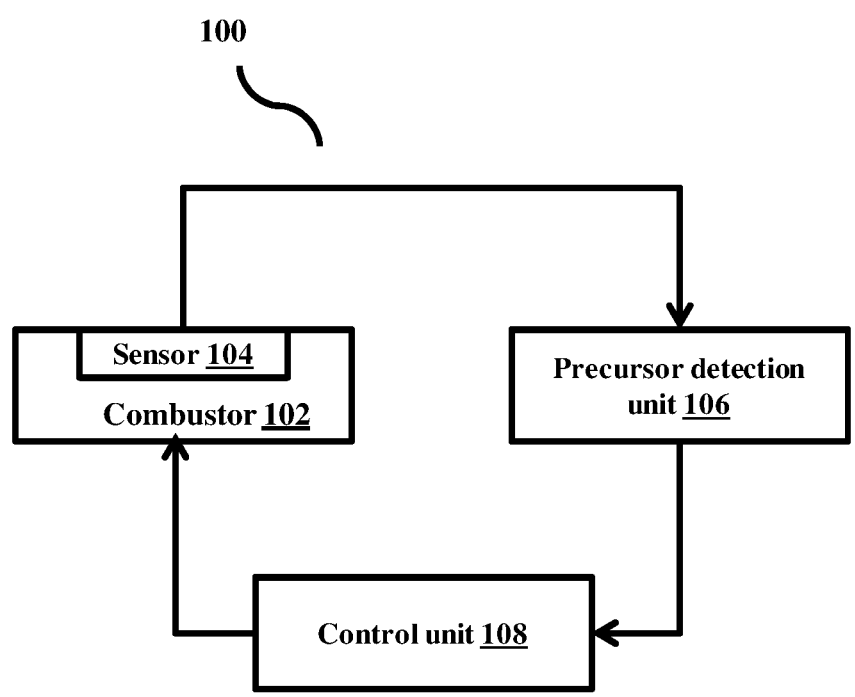
FIG. 1 illustrates various modules of a system for detecting one or more blowout precursors to control blowout in a combustor, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for detecting one or more blowout precursors to control lean blow out in a combustion system. The system and the method detects one or more blowout precursors using one or more parameters including but not limited to a Hurst exponent estimation, a Burst count estimation, and a recurrence quantification based estimation.

Usage of combination of the Hurst exponent estimation, the Burst count estimation and the recurrence quantification based estimation provides a robust prediction of occurrence of lean blowout, thereby enabling better control to prevent occurrence of lean blowout in the combustors. The recurrence quantification is used to detect and quantify the presence of intermittency in time series signal of the dynamic state variable.

Throughout the description the term lean blowout is alternatively referred as blowout.

Throughout the description the term blowout precursor is alternatively referred as precursor.

Referring now to the drawings, and more particularly to FIGS. 1 through 8, where similar reference characters denote corresponding features consistently throughout the figures, there are shown preferred embodiments.

FIG. 1 illustrates various modules of a system 100 for detecting one or more blowout precursors to control blowout in a combustor, according to embodiments as disclosed herein. In an embodiment, the system includes a combustor 102 with a sensor 104, a precursor detection unit 106 and a control unit 108. The system 100 is a feedback combustion system to control and prevent occurrence of blowout in the combustor 102. The feedback element of the system 100 can include one or more sensors placed in the combustor 102 and configured to measure one or more dynamic state variables of the combustor 102. The measured dynamic state variable can be monitored by the precursor detection unit 106 placed in the feedback loop. The pre-cursor detection unit 106 can be configured to detect one or more precursors to blowout by analyzing the measured dynamic state variables received from one or more sensors. In an embodiment, the dynamic state variables measured can include but are not limited to pressure, velocity, chemiluminescence intensity, any dynamic state variable capable of providing precursors to the blowout or a combination of one or more dynamic state variables.

In an embodiment, the system 100 includes the sensor 104 in the combustor 102 that can be configured to sense a dynamic state variable of the combustor 102. The sensor 104 can be configured to sense variations in the dynamic state variable and produce a time series signal or data corresponding to the sensed variations. For example, the sensor 104 may be configured to conduct optic or acoustic measurement or both based on the dynamic state variables being measured.

The precursor detection unit 106 can be configured to analyze the time series signal measured by the sensor 104 and detect one or more precursors to the blowout in the combustor 102.

As can be understood by person skilled in the art, the measured time series signal received by the precursor detection unit 106 from the sensor 104 can be preprocessed for noise removal and amplification by a signal conditioner (not shown).

In an embodiment, in case the sensor 104 provides the time series signal in analog domain, an analog to digital converter (not shown) can be used for converting the time series signal from analog domain to digital domain before being analyzed by the precursor detection unit 106.

The analysis performed by the precursor detection unit 106 is based on the principle that prior to the blowout, there is a variation in the multifractal nature of the time series signal. Further, prior to blowout dynamic states of the dynamic state variables of the combustor 102 are also characterized by the intermittent behavior (intermittency) of the time series signal. The intermittency is a dynamical state of any system under consideration, where the system exhibits two or more dynamic behaviors alternatively. In an embodiment, the dynamic behaviors are periodic and aperiodic oscillations. The combustor 102 exhibits intermittency close to blowout. During intermittency, the time series signal corresponding to the dynamic state variable of the combustor 102 is characterized by regions of high amplitude fluctuations alternating with regions of low amplitude fluctuations. The proposed system and method detects blowout by detecting the variations in the multifractal behavior and/or detecting the presence of intermittency in the dynamic state variable being monitored using recurrence quantification.

Intermittency and multifractality of the time series signal can be detected using several estimates from theory of time series analysis. In an embodiment, the analysis of the time series signal can be performed using one or more parameters including but not limited to the Hurst exponent estimation, the Burst count estimation, and the recurrence quantification based estimation. The precursor detection unit 106 can be configured to estimate a Hurst exponent, a Burst count and/or calculate one or more derived estimates based on the recurrence quantification to detect variation in multifractality and/or intermittency of the time series signal and then predict blowout.

However, it is also within the scope of the invention that any other type of estimates based on recurrence and multifractal spectrum analysis may also be used without otherwise deterring intended function of the estimates as can be deduced from the description.

In an embodiment, the precursor detection unit 106 described herein can include for example, but not limited to, microprocessor, microcontroller, controller, smart phone, portable electronic device, programmable logic controller, communicator, tablet, laptop, computer, consumer electronic device, a combination thereof, or any other device capable of processing signals received from the sensor 104.

Upon detection of one or more precursors by the precursor detection unit 106, the control unit 108 can be configured to generate one or more control signals in accordance to the detected one or more precursors. The control unit 108 can be configured to vary one or more parameters of the combustor

102 such as the operational parameters based on the one or more control signals generated by the control unit 108.

In an embodiment, the control unit 108 can be configured to send one or more control signals to an actuator assembly (not shown) that allows to dynamically vary the operational parameters (for example air flow rate) of the combustor 102.

Thus, the system 100 is configured to seamlessly monitor and analyze the time series signal, detect one or more precursor and apply correction to the combustor parameters (operational parameters) by generating control signals in accordance with the detected one or more precursors.

Figure 2:
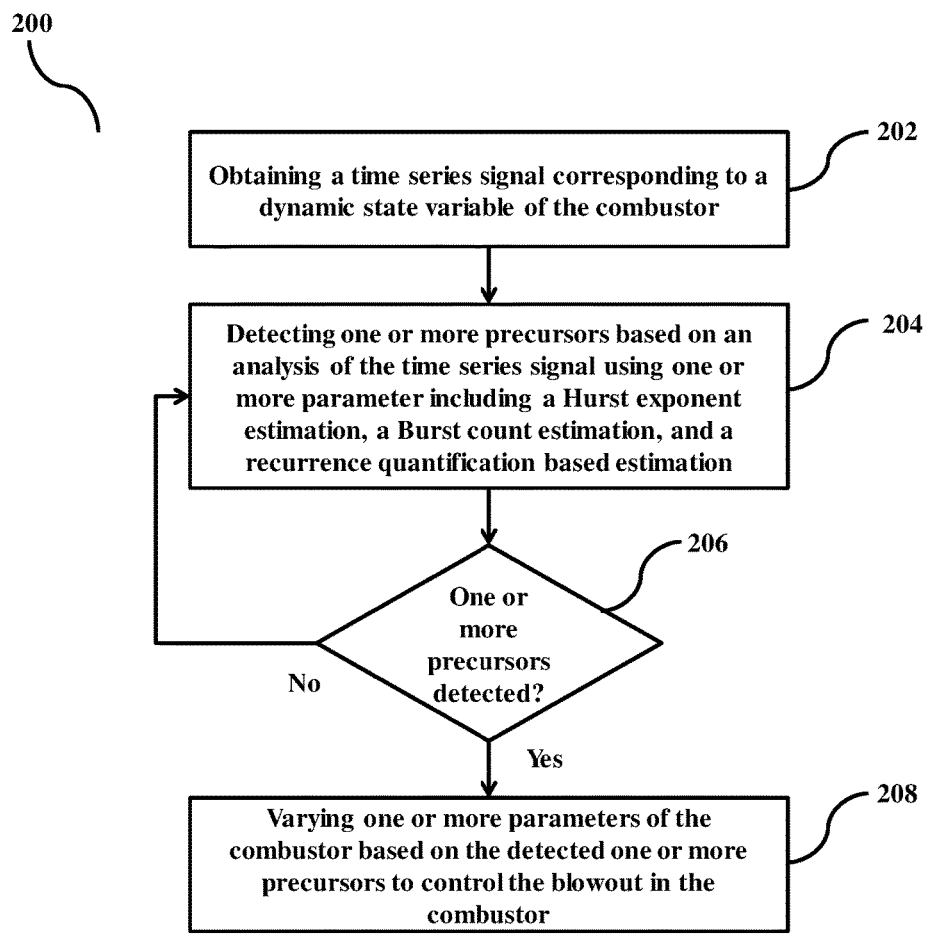
FIG. 2 is a flow diagram illustrating a method for detecting one or more blowout precursors to control blowout in the combustor, according to embodiments as disclosed herein.

FIG. 2 is a flow diagram illustrating a method 200 for detecting one or more blowout precursors to control blowout in the combustor, according to embodiments as disclosed herein. At step 202, the method 200 includes obtaining the time series signal corresponding to the dynamic state variable of the combustor. In an embodiment, the method 200 allows the precursor detection unit 106 to obtain the time series signal corresponding to the dynamic state variable of the combustor measured by the sensor 104 of the combustor 102.

At step 204, the method 200 includes detecting one or more precursors to blowout based on an analysis of the time series signal using one or more parameter. As described in the FIG. 1, the analysis of the time series signal to detect the precursor corresponds to detection of variation in the multifractal behavior of the time series signal. In an embodiment the parameters to analyze the time series signal for detecting the precursors include but are not limited to the Hurst exponent estimation, the Burst count estimation, and the recurrence quantification based estimation and the like, also can be commonly referred as estimation parameters. Detection of one or more precursors based on each of the estimation parameters above is described in detail in conjunction with the FIG. 3, FIG. 4, and FIG. 5 respectively. In an embodiment, the method 200 configures the precursor detection unit 106 to detect one or more precursors based on the analysis of the time series signal using one or more estimation parameters.

In an embodiment the method 200 includes using any one of the estimation parameters described.

In an embodiment, the method 200 includes detecting the precursors using each of the Hurst exponent, the Burst count and the recurrence quantification based estimation.

The Hurst exponent based estimation includes estimating one or more Hurst exponents which are described later in FIG. 3. The recurrence quantification based estimation includes one or more derived estimates through the recurrence quantification. The derived estimates include but are not limited to a recurrence rate, a maximum diagonal length, a maximum vertical length, a trapping time and a Shanon entropy. Multiple derived estimates are described later in FIG. 5. The recurrence quantification is used to detect and quantify the presence of intermittency in time series signal of the dynamic state variable.

Usage of plurality of estimation parameters to analyze the time series signal from the sensor 104 provides robust prediction of the about-to-occur blowout referred as an impending blowout in the combustor 102.

At step 206, the method 200 includes determining whether one or more precursors are detected after analysis of the time series signal. In an embodiment, the method 200 allows the precursor detection unit 106 to detect one or more precursors. If at step 206, it is determined that one or more precursors are detected then, at step 208, the method 200 includes varying one or more parameter of the combustor 102, based on the detected one or more precursors, to control the blowout in the combustor 102. In an embodiment, the method 200 allows the control unit 108 to varying one or more parameter of the combustor 102 based on the detected one or more precursors to control the blowout in the combustor 102.

The method 200 continues to seamlessly analyze the time series signal for every window of the time series signal. The window of the time series signal to be analyzed can be predefined, and the time series signal analysis can be repeated for successive window in time domain for the time series signal obtained from the sensor 104. The various actions, acts, blocks, steps, and the like in the method 200 may be performed in the order presented, in a different order or simultaneously. Further, in some embodiments, some actions, acts, blocks, steps, and the like may be omitted, added, modified, skipped, and the like without departing from the scope of the invention.

Figure 3:
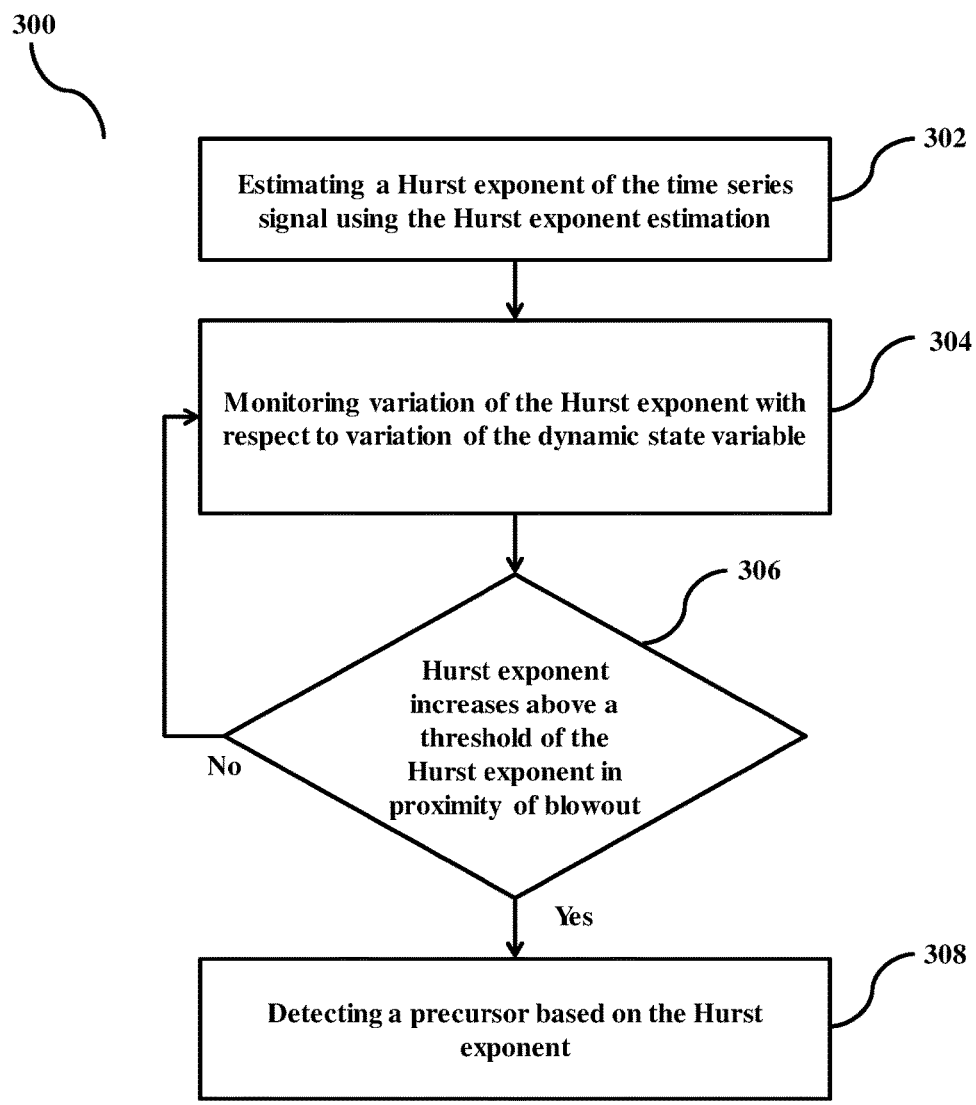
FIG. 3 is a flow diagram illustrating detection of one or more blowout precursors using a Hurst exponent estimation, according to embodiments as disclosed herein.

FIG. 3 is a flow diagram illustrating a method 300 for detection of one or more precursors using a Hurst exponent estimation, according to embodiments as disclosed herein. At step 302, the method 300 includes estimating a Hurst exponent of the time series signal obtained from the sensor 104 using the Hurst exponent estimation to study the multifractal characteristics of the time series signal. In an embodiment, the method 300 allows the precursor detection unit 106 to estimate the Hurst exponent of the time series signal obtained from the sensor 104 using the Hurst exponent estimation.

The Hurst exponent is the measure of fractal nature of a signal. It is a measure of long term memory of the time series signal. It can be estimated as follows, Consider a time series X, given by $\{X_1, X_2, \ldots, X_n\}$
The mean of the time series is as in equation 1 below:

$$\text{mean}(X) = m = \frac{1}{n}\sum_{i=1}^{n} X_i \quad (1)$$

Constructing a mean adjusted vector $Y_i$, in order to get the fluctuations alone, $Y_i = X_i - m$ for $i=1$ to $n$ Now using mean adjusted vector, a cumulative series is formed as in equation 2, $$Z_t = \sum_{i=1}^{t} Y_i \text{ for } t=1 \text{ to } n \quad (2)$$

The range for the cumulative $Z_t$ is, $R(n) = \max(Z_1, Z_2, \ldots, Z_n) - \min(Z_1, Z_2, \ldots, Z_n)$ and the standard deviation is given by equation 3 below:

$$S(n) = \sqrt{\frac{1}{n}\sum_{i=1}^{n}(X_i - m)^2} \quad (3)$$

Defining a rescaled range for the cumulative series as, $$\text{Rescaled range} = \frac{R(n)}{S(n)}.$$

Now, the rescaled range is the function of the number of data points. Finding out the expectation (E) of rescaled range as a function of the length of the time series gives the following relationship from which the Hurst exponent H can be determined as in equation 4 below:

$$E\left[\frac{R(n)}{S(n)}\right] = Cn^H \quad (4)$$

Where, n is the time span of the observation (number of data points in a time series) and C is a constant.

The Hurst exponent described in equation 4 is an example of plurality of Hurst exponents that can be estimated. The method 300 includes deriving one or more Hurst exponents ($H_q$), where q could be any real number. For example, plurality of Hurst exponents include $H_2$ (the procedure of estimation of which is given above), $H_3$, $H_4$ and the like. For estimating $H_q$, in the above procedure equation 3 is modified as provided by equation 5 below:

$$S(n) = \left(\frac{1}{n}\sum_{i=1}^{n}(X_i - m)^q\right)^{1/q} \quad (5)$$

While rest of the procedure for estimating Hurst exponent remains the same.

Upon estimating the Hurst exponent, at step 304, the method 300 includes monitoring variation of the Hurst exponent with respect to variation of the dynamic state variable corresponding to the time series signal being measured. In an embodiment, the method 300 allows the precursor detection unit 106 to monitor variation of the Hurst exponent with respect to variation of the dynamic state variable corresponding to the time series signal being measured.

At step 306, the method 300 includes determining whether the estimated Hurst exponent increases above a threshold of the Hurst exponent in proximity of blowout in the combustor 102.

In an embodiment, the blowout value can be derived based on the pre-conducted experiments.

If at step 306, it is determined that the Hurst exponent increases above the threshold of the Hurst exponent then, at step 308, the method 300 includes detecting a precursor based on the Hurst exponent. If the derived estimate does not increase above the threshold of the Hurst exponent, the method 300 includes repeating the steps from step 304 and includes continuing monitoring variation of the Hurst exponent with respect to variation of the dynamic state variable. The various actions, acts, blocks, steps, and the like in the method 300 may be performed in the order presented, in a different order or simultaneously. Further, in some embodiments, some actions, acts, blocks, steps, and the like may be omitted, added, modified, skipped, and the like without departing from the scope of the invention.

Figure 4:
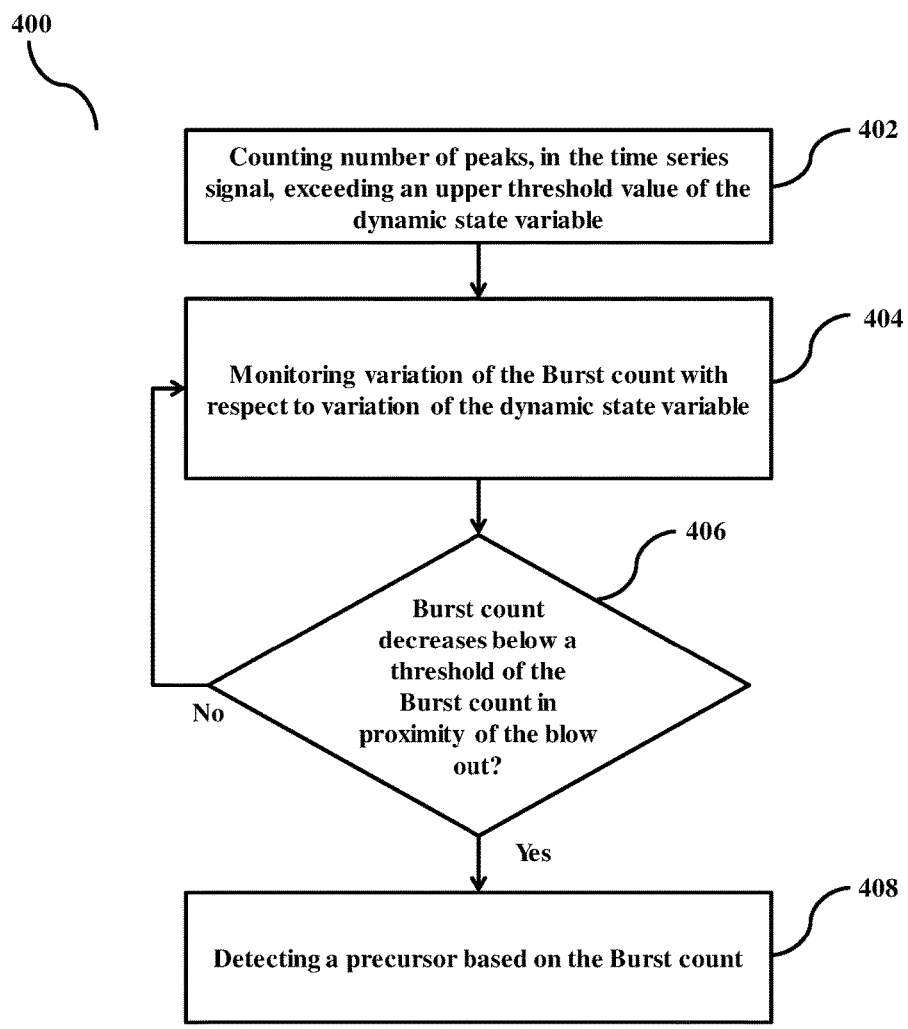
FIG. 4 is a flow diagram illustrating the detection of one or more blowout precursors using a Burst count estimation, according to embodiments as disclosed herein.

FIG. 4 is a flow diagram illustrating a method 400 for detection of one or more precursors using the Burst count estimation, according to embodiments as disclosed herein.

In an embodiment, the Burst count for the time series signal can be defined as the number of the peaks in the time series signal that rise above a critical value of dynamic state variable corresponding to the time series signal. For example, the Burst count for a pressure time trace is defined as the number of the peaks in pressure above a critical value of acoustic pressure. At step 402, the method 400 includes counting number of peaks, in the time series signal, exceeding an upper threshold value of the dynamic state variable.

In an embodiment, the method 400 allows the precursor detection unit 106 to count number of peaks, in the time series signal, exceeding an upper threshold value of the dynamic state variable. At step 404, the method 400 includes monitoring the variation of the Burst count of the time series signal with respect to variation of the dynamic state variable measured by the sensor 104. In an embodiment, the method 400 allows the precursor detection unit 106 to monitor the variation of the Burst count of the time series signal with respect to variation of the dynamic state variable measured by the sensor 104. At step 406, the method 400 includes determining whether the Burst count decreases below a threshold of the Burst count in proximity of the blowout in the combustor 102. In an embodiment, the method 400 allows the precursor detection unit 106 to determine whether the Burst count decreases below a threshold of the Burst count in proximity of the blowout in the combustor 102. If at step 406 it is determined that the Burst count decreases below the threshold of the Burst count in proximity of the blowout in the combustor 102 then, at step 408, the method 400 includes detecting a precursor based on the Burst count to control blowout in the combustor 102. If at step 406, the derived estimate does not decrease below the threshold of the Burst count, the method 400 includes repeating the steps from step 404 and includes continuing monitoring variation of the Burst count with respect to variation of the dynamic state variable. The various actions, acts, blocks, steps, and the like in the method 400 may be performed in the order presented, in a different order or simultaneously. Further, in some embodiments, some actions, acts, blocks, steps, and the like may be omitted, added, modified, skipped, and the like without departing from the scope of the invention.

Figure 5:
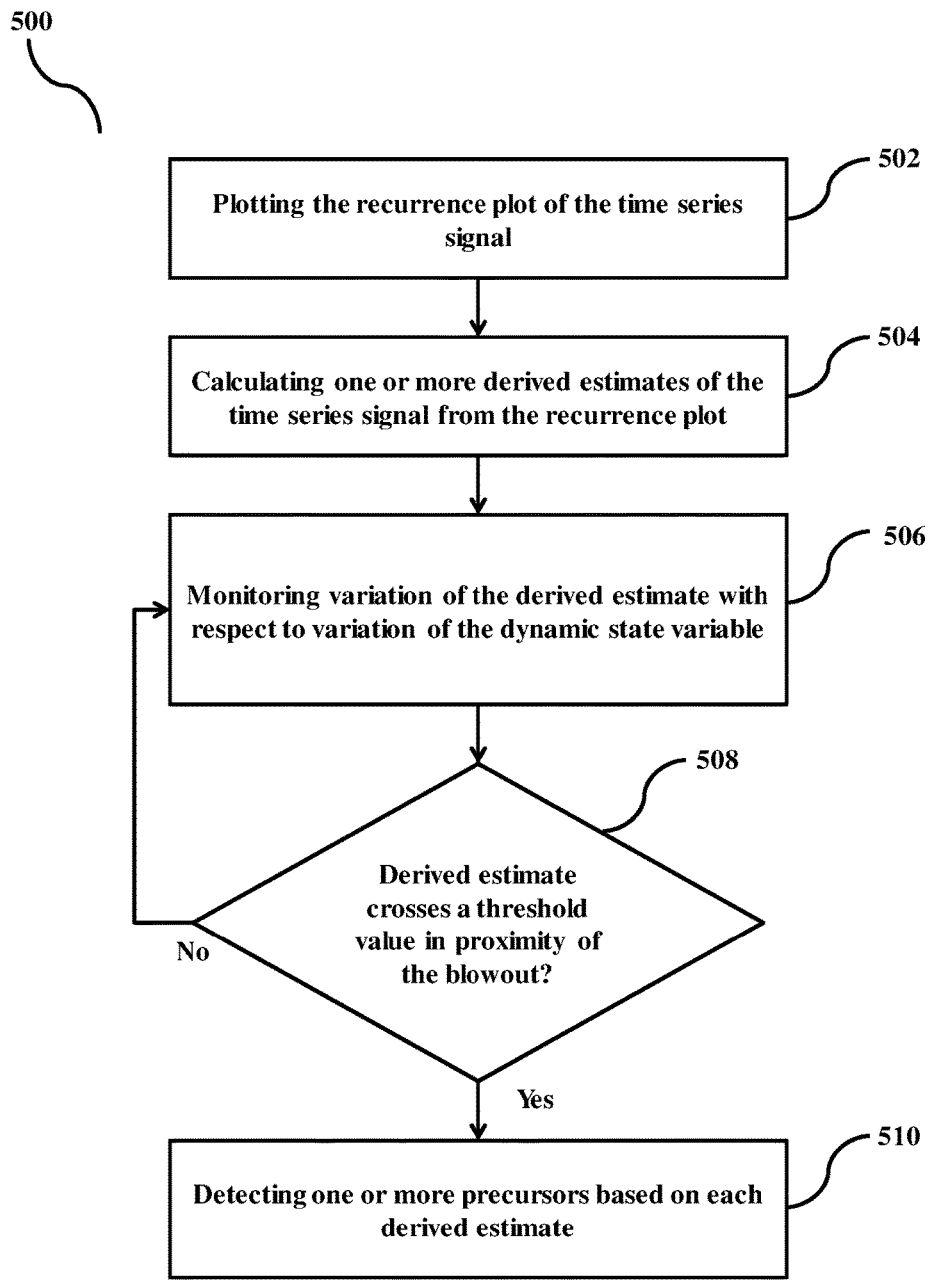
FIG. 5 is a flow diagram illustrating the detection of one or more blowout precursors using a recurrence quantification based estimation, according to embodiments as disclosed herein.

FIG. 5 is a flow diagram illustrating a method 500 for detection of one or more precursors using the recurrence quantification based estimation, according to embodiments as disclosed herein. The recurrence quantification is used to detect and quantify the presence of intermittency in time series signal of the dynamic state variable.

At step 502, the method 500 includes plotting the recurrence plot (or deriving the corresponding matrix) of the time series signal. In an embodiment, the method 500 allows the precursor detection unit 106 to plot the recurrence plot of the time series signal. The recurrence plot is a plot that indicates for a particular point in time, the times at which the state of the dynamic state variable revisits roughly the same area of the phase space. Hence, the recurrence plot can be used to identify the recurrent behavior of a dynamical system from the time series data of any one of the state variable. The characteristics of the recurrence plot vary as the dynamics of the combustor 102 of the system 100 vary.

At step 504, the method 500 includes, calculating one or more derived estimates of the time series signal from the recurrence plot. In an embodiment, the method 500 allows the precursor detection unit 106 to calculate one or more derived estimates of the time series signal from the recurrence plot.

In an embodiment, the derived estimates such as recurrence rate and maximum diagonal length derived from recurrence plot are used to detect the precursors to blowout in the combustor 102. In an embodiment, the derived estimates such as the trapping time, the maximum vertical line lengths or any other estimate derived from a recurrence plot can be used to identify the precursors to blowout without otherwise deterring the intended function of the estimate as can be deduced from the description. Hence these estimates from the recurrence plot can be used to predict an impending blowout. Some example derived estimates are described below. Some derived estimates such as recurrence rate and maximum diagonal length are described in detail later in FIGS. 8a and 8b along with simulation results for precursor detection using these derived estimates.

As can be understood by a person skilled in the art, the method 500 is not limited to the examples provided but can include any other derived estimates.

The calculation of the recurrence rate is described below. Suppose S(t) be the state point representing the combustor 102. If S(t+τ), is within the ε-ball centered at S(t), the point (t, τ) is depicted as a point in the recurrence plot, that is, R(t, τ)=1. The simplest measure (derived estimate) is the recurrence rate (RR), which is the density of recurrence points in the recurrence plot as given below in equation 6, $$RR = \frac{1}{N^2}\sum_{i,j=1}^{N} R(i,j) \quad (6)$$

Recurrence rate indicates the probability that a specific state of the dynamic state variable will recur.

The calculation for another example derived estimate is provided below which indicates percentage of recurrence points which constitutes diagonal lines in the recurrence plot of minimal length $l_{min}$. This measure (derived estimate) is called determinism (DET) and is indicative of the predictability of the dynamical system (here combustor 102) and is given in equation 7 below:

$$DET = \frac{\sum_{l=l_{min}}^{N} lP(l)}{\sum_{i,j=1}^{N} R(i,j)} \quad (7)$$

Here P(l) is the frequency distribution of the lengths l of the diagonal lines.

In an example, amount of recurrence points which form vertical lines can be quantified in the same way. This measure (derived estimate) is called laminarity (LAM) and it indicates the amount of laminar phases in the system (which is a measure of intermittency) and in given in equation 8 below:

$$LAM = \frac{\sum_{v=v_{min}}^{N} vP(v)}{\sum_{i,j=1}^{N} vP(v)} \quad (8)$$

Where, P(v) is the frequency distribution of the lengths v of the vertical lines, which have at least a length of $v_{min}$.

In an example of derived estimate, the lengths of the diagonal and vertical lines can be measured as well. The averaged diagonal line length (L) is given in equation 9 below:

$$L = \frac{\sum_{l=l_{min}}^{N} lP(l)}{\sum_{l=l_{min}}^{N} P(l)} \quad (9)$$

L is indicative of the predictability time of the dynamical system (here combustor 102).

In an example, the trapping time TT, measures the average length of the vertical lines and is related with the laminarity time of the dynamical system (here, the combustor 102) indicating how long the system (here, the combustor 102) remains in a specific state corresponding to the dynamic state variable. The trapping time is calculated as given by equation 10 below:

$$TT = \frac{\sum_{v=v_{min}}^{N} vP(v)}{\sum_{v=v_{min}}^{N} P(v)} \quad (10)$$

Suppose, the maximal diagonal line length be $L_{max}$, then the divergence (DIV) is as given in equation 11 below, $$DIV = 1/L_{max} \quad (11)$$

The probability P(l) that a diagonal line has exactly length l can be estimated from the frequency distribution P(l) as given in equation 12 below:

$$P(l) = \frac{P(l)}{\sum_{l=l_{min}}^{N} P(l)} \quad (12)$$

In an example of derived estimate, the Shannon entropy of the above probability P(l) is ENTR as given in equation 13 below. This indicates the complexity of the deterministic structure in the system (here, the combustor 102).

$$ENTR = -\Sigma_{l=l_{min}}^{N} P(l) \ln P(l) \quad (13)$$

At step 506, the method 500 includes monitoring the variation of the derived estimate with respect to variation of the dynamic state variable. In an embodiment, the method 500 allows the precursor detection unit 106 to monitor variation of the derived estimate with respect to variation of the dynamic state variable.

At step 508, the method 500 includes determining whether the derived estimate crosses a threshold of a recurrence parameter in proximity of the blowout in the combustor 102. In an embodiment, the method 500 allows the precursor detection unit 106 to determine whether the derived estimate crosses a threshold of the recurrence parameter in proximity of the blowout in the combustor 102.

If at step 508, it is determined that the derived estimate crosses the threshold of the recurrence parameter, then at step 510, the method 500 includes detecting one or more precursors to control the blowout in the combustor 102. In an embodiment, the method 500 allows the precursor detection unit 106 to detect one or more precursors to control the blowout in the combustor 102.

If at step 508, the derived estimate does not cross the threshold of the recurrence parameter, the method 500 includes repeating the steps from step 506 and includes continuing monitoring the variation of the derived estimate with respect to variation of the dynamic state variable.

The various actions, acts, blocks, steps, and the like in the method 500 may be performed in the order presented, in a different order or simultaneously. Further, in some embodiments, some actions, acts, blocks, steps, and the like may be omitted, added, modified, skipped, and the like without departing from the scope of the invention.

Figure 6:
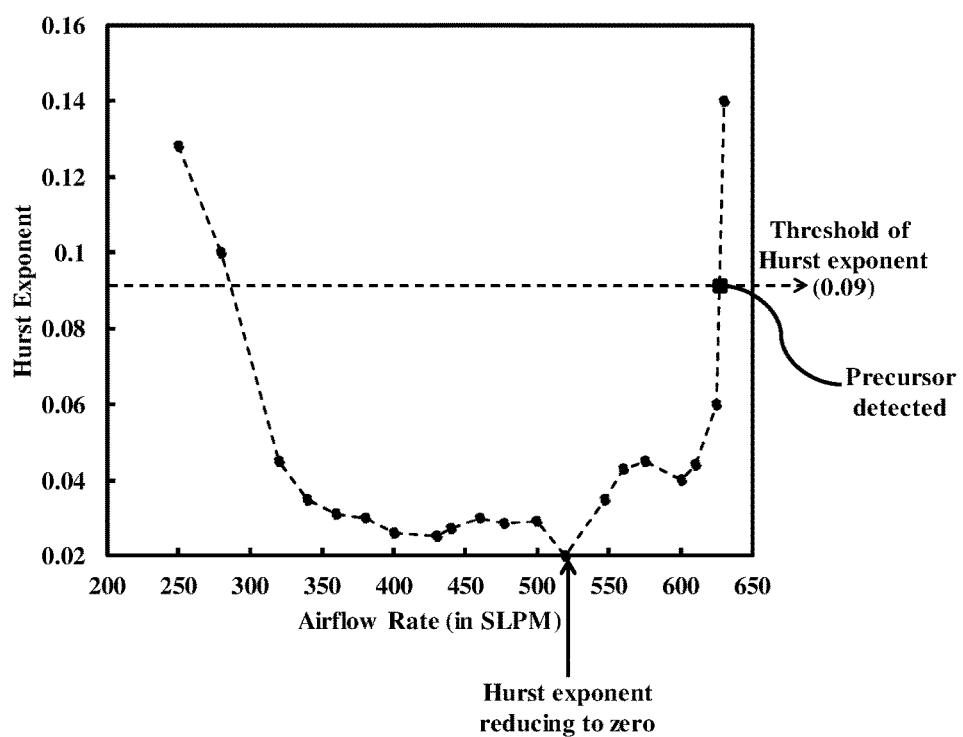
FIG. 6 is an example graph illustrating the detection of a blowout precursor based on the Hurst exponent estimation of air flow rate in the combustor, according to embodiments as disclosed herein.

FIG. 6 is an example graph illustrating detection of a blowout precursor based on the Hurst exponent estimation as a function of the air flow rate in the combustor, according to embodiments as disclosed herein. The figure shows a graph indicating test results obtained from a combustor (not shown) of the combustor 102 for detecting precursors to blowout using the Hurst exponent. The graph depicts the variation in the Hurst exponent with variation in the value of a flow parameter (here, the air flow rate). In an embodiment, the graph can be a plot of the Hurst exponent against a combustion parameter or an ambient parameter or any other parameter that influences the dynamic behavior of the combustor 102 without otherwise deterring the intended function of the parameter as can be deduced from the description. The graph in the FIG. 6 indicates the variation in the Hurst exponent as the combustor 102 approaches blowout along the air flow rate. As the air flow parameter approaches the blowout in the combustor 102, the Hurst exponent reduces and is close to zero due to the growth of acoustic oscillations inside the combustor 102 as can be seen in the figure when the air flow rate is between 500 to 550 SLPM. However, close to blowout, the Hurst exponent starts increasing because of presence of intermittency at those parameter locations. This increase in Hurst exponent H close to blowout is the precursor to the impending blowout. Based on the system 100 requirements, an operator can predefine the threshold of the Hurst exponent which defines a reference point to indicate detection on precursor along the increasing Hurst exponent value from 0 to 0.14 for the air flow rate above 550 SLPM. As described in FIG. 3, the estimate of the Hurst exponent is calculated based on the multifractal spectrum of the time series signal.

Figure 7:
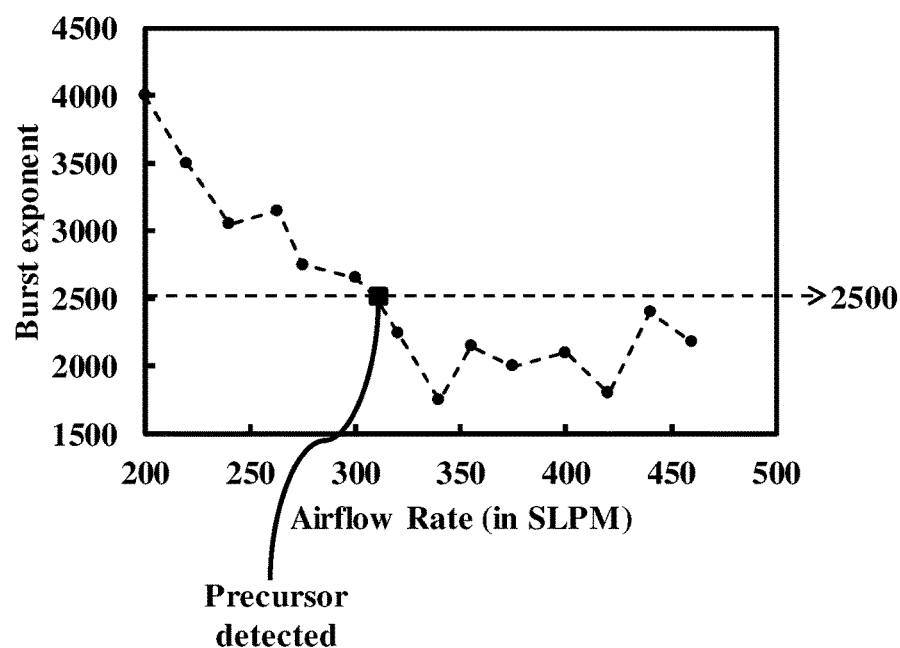
FIG. 7 is an example graph illustrating the detection of the blowout precursor based on the Burst count estimation of air flow rate in the combustor, according to embodiments as disclosed herein.

FIG. 7 is an example graph illustrating detection of the blowout precursor based on the Burst count estimation of air flow rate in the combustor, according to embodiments as disclosed herein. The figure shows a graph plotted between the Burst count and the air flow rate, depicting the variation in the Burst count with variation in the value of a flow parameter. However, it is also within the scope of the invention that the parameter plotted against the burst count, can be a combustion parameter or an ambient parameter or any other parameter that influences the dynamic behavior of the combustor 102 without otherwise deterring the intended function of the parameter as can be deduced from the description. As described in FIG. 4, the burst count the time series signal can be defined as the number of the peaks in the time series signal that rise above the critical value of dynamic state variable corresponding to the time series signal. A predefined duration (window) of the time series signal is considered within which the Burst count is counted.

In an embodiment, the threshold pressure amplitude deciding the critical value for calculating the burst count can be chosen as X % of the peak amplitude of time series signal in that respective window at the parameter location acquired for a finite length of time. The value of X can be chosen judiciously depending up on the data of the time series data.

In an embodiment, the threshold pressure amplitude deciding the critical value for calculating the burst count can be based on absolute value of pressure amplitude.

The selection of threshold pressure amplitude is not limited to the above embodiments but can be performed using similar other criteria.

For example, here the value of X chosen is 10 and duration of the time series data for calculating the Burst count is 3 seconds. Since the absolute value of threshold is different for each time series signal, the effect of increasing amplitude of the combustion noise is not significant in the measure of the Burst count. However, the presence of intermittency is characterized by a decrease in the burst count (precursor) near to blowout in the combustor. Based on the requirement of the system 100, the operator can predefine the threshold (for example 2500) of the Burst count which defines a reference point to indicate detection of the precursor along the decreasing Burst count from 4000.

Figure 8A:
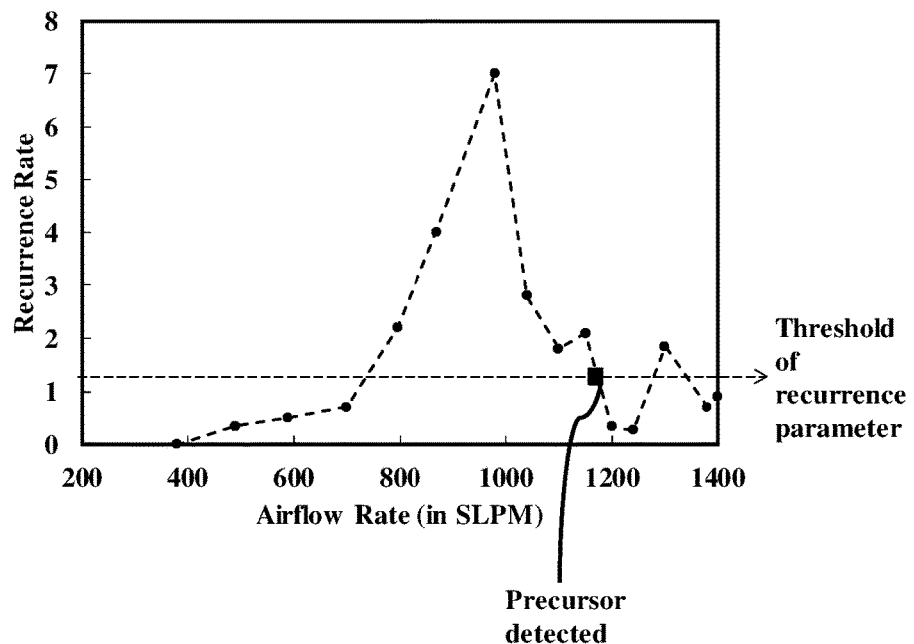
FIG. 8a is an example graph illustrating the detection of the blowout precursor based on the recurrence quantification based estimation by monitoring variation of a recurrence rate of an acoustic pressure signals with variation of the air flow rate in the combustor, according to embodiments as disclosed herein.

FIG. 8a is an example graph illustrating detection of the blowout precursor based on the recurrence quantification based estimation by monitoring the variation of a recurrence rate of an acoustic pressure signals with variation of the air flow rate in the combustor, according to embodiments as disclosed herein. The figure shows is a graph plotted between the recurrence rate of the acoustic pressure signals and the air flow rate, depicting the variation in recurrence rate of the acoustic pressure signals with variation in the value of a flow parameter. However, it is also within the scope of the invention that the parameter plotted against the recurrence rate of the acoustic pressure signals, can be a combustion parameter or an ambient parameter or any other parameter that influences the dynamic behavior of the combustor 102 without otherwise deterring the intended function of the parameter as can be deduced from the description. The graph of the figure indicates that the recurrence rate reduces near the blowout because of the presence of intermittent behavior of pressure oscillations.

Figure 8B:
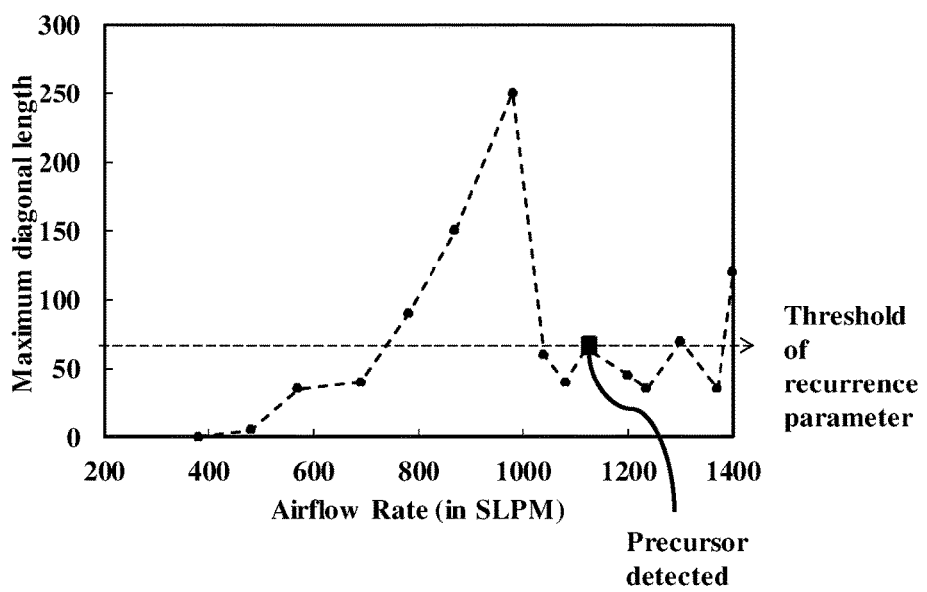
FIG. 8b is an example graph illustrating the detection of the blowout precursor based on the recurrence quantification based estimation by monitoring the variation of a maximum diagonal length of the acoustic pressure signals with variation of the air flow rate in the combustor, according to embodiments as disclosed herein.

FIG. 8b is an example graph illustrating detection of the blowout precursor based on the recurrence quantification based estimation by monitoring variation of a maximum diagonal length of an acoustic pressure signals with variation of the air flow rate in the combustor, according to embodiments as disclosed herein. The figure shows a graph plotted between the maximum diagonal lengths derived through the recurrence quantification based estimation of the recurrence plot of the acoustic pressure signals and the air flow rate. However, it is also within the scope of the invention that the parameter plotted against the recurrence rate of the acoustic pressure signals, can be a combustion parameter or an ambient parameter or any other parameter that influences the dynamic behavior of the combustor 102 without otherwise deterring the intended function of the parameter as can be deduced from the description. The figure indicates that the maximum diagonal length reduces near the blowout because of the presence of intermittent behavior of pressure oscillations.

The embodiments disclosed herein can be implemented through at least one software program running on at least one hardware device and performing network management functions to control the elements. The elements shown in the FIG. 1 includes blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for controlling combustion blowout in a combustor, the method comprising:
    obtaining a time series signal corresponding to a dynamic state variable of the combustor;
    detecting at least one precursor to blowout based on an analysis of the time series signal using at least one estimation parameter, the at least one estimation parameter comprising at least one of a Hurst exponent estimation, a Burst count estimation, or a recurrence quantification based estimation, wherein the analysis comprises evaluating multifractality of the time series signal based on the at least one estimation parameter and characterizing intermittency in the time series signal based on the at least one estimation parameter, wherein evaluating multifractality of the time series signal comprises detecting variations in multifractality of the time series signal, wherein characterizing intermittency in the time series signal comprises determining whether intermittency is present in the time series signal, and wherein intermittency is a dynamic state of the combustor exhibiting two or more dynamic behaviors alternatively, wherein the at least one estimation parameter comprises the Hurst exponent estimation, and wherein detecting the at least one precursor to blowout based on the analysis of the time series signal comprises:
  estimating at least one Hurst exponent;
  monitoring variation of the at least one Hurst exponent with respect to variation of the dynamic state variable;
  determining whether the at least one Hurst exponent increases above a Hurst exponent threshold in proximity to blowout; and
  detecting the at least one precursor in response to determining that the at least one Hurst exponent increases above the Hurst exponent threshold in proximity to blowout,
the method further comprising:
generating at least one control signal based on the detected at least one precursor; and
varying at least one operating parameter of the combustor based on the at least one control signal, wherein variation in the at least one operating parameter is dynamically performed on detecting the at least one precursor in order to control blowout in the combustor.

2. The method of claim 1, wherein the at least one estimation parameter further comprises the recurrence quantification based estimate, wherein the recurrence quantification based estimate is based on at least one derived estimate.

3. The method of claim 1, wherein the at least one estimation parameter further comprises the Burst count estimation, and wherein detecting the at least one precursor to blowout based on the analysis of the time series signal further comprises:
  counting a number of peaks in the time series signal exceeding an upper threshold value of the dynamic state variable, the number of peaks being a Burst count of the time series signal;
  monitoring variation of the Burst count with respect to variation of the dynamic state variable;
  determining whether the Burst count decreases below a Burst count threshold value in proximity to blowout; and
  detecting the at least one precursor in response to determining that the Burst count decreases below the Burst count threshold value in proximity to blowout.

4. The method of claim 1, wherein the at least one estimation parameter further comprises the recurrence quantification based estimation, and wherein detecting the at least one precursor to blowout based on the analysis of the time series signal further comprises:
  plotting a recurrence plot of the time series signal;
  calculating at least one derived estimate of the time series signal from the recurrence plot;
  monitoring variation of the at least one derived estimate with respect to variation of the dynamic state variable;
  determining whether the at least one derived estimate crosses a recurrence threshold value; and
  detecting the at least one precursor in response to determining that the at least one derived estimate crosses the recurrence threshold value.

5. A system for controlling combustion blowout in a combustor, the system comprising:
  a precursor detection unit configured to:
    obtain a time series signal corresponding to a dynamic state variable of the combustor;
    detect at least one precursor to blowout based on an analysis of the time series signal using at least one estimation parameter, the at least one estimation parameter comprising at least one of a Hurst exponent estimation, a Burst count estimation, or a recurrence quantification based estimation, wherein the analysis comprises an evaluation of multifractality of the time series signal based on the at least one estimation parameter and a characterization of intermittency in the time series signal based on the at least one estimation parameter, wherein the evaluation of multifractality of the time series signal comprises detecting variations in multifractality of the time series signal, wherein the characterization of intermittency in the time series signal comprises a determination of whether intermittency is present in the time series signal, and wherein intermittency is a dynamic state of the combustor exhibiting two or more dynamic behaviors alternatively, wherein the at least one estimation parameter comprises the Hurst exponent estimation, and wherein the precursor detection unit is configured to detect the at least one precursor to blowout based on the analysis of the time series signal using the Hurst exponent estimation, the precursor detection unit further configured to:
      estimate at least one Hurst exponent;
      monitor variation of the at least one Hurst exponent with respect to variation of the dynamic state variable;
      determine whether the at least one Hurst exponent increases above a Hurst exponent threshold in proximity to blowout; and
      detect the at least one precursor in response to determining that the at least one Hurst exponent increases above the Hurst exponent threshold in proximity to blowout;
  the system further comprising a control unit configured to:
    receive an indication from the precursor detection unit when the at least one precursor is detected;
    generate at least one control signal based on the received indication that the at least one precursor is detected; and
    vary at least one operating parameter of the combustor based on the at least one control signal,
    wherein variation in the at least one operating parameter is dynamically performed to control blowout in the combustor.

6. The system of claim 5, wherein the at least one estimation parameter further comprises the recurrence quantification based estimate, wherein the recurrence quantification based estimate is based on at least one derived estimate.

7. The system of claim 5, wherein the precursor detection unit is further configured to detect the at least one precursor to blowout based on the analysis of the time series signal using the Burst count estimation, the precursor detection unit further configured to:
- count a number of peaks in the time series signal exceeding an upper threshold value of the dynamic state variable, the number of peaks being a Burst count of the time series signal;
- monitor variation of the Burst count with respect to variation of the dynamic state variable;
- determine whether the Burst count decreases below a Burst count threshold value in proximity to blowout; and
- detect the at least one precursor in response to determining that the Burst count decreases below the Burst count threshold value in proximity to blowout.

8. The system of claim 5, wherein the precursor detection unit is further configured to detect the at least one precursor to blowout based on the analysis of the time series signal using the recurrence quantification based estimation, the precursor detection unit further configured to:
- plot a recurrence plot of the time series signal;
- calculate at least one derived estimate of the time series signal from the recurrence plot;
- monitor variation of the at least one derived estimate with respect to variation of the dynamic state variable;
- determine whether the at least one derived estimate crosses a recurrence threshold value; and
- detect the at least one precursor in response to determining that the at least one derived estimate crosses the recurrence threshold value.

* * * * *